July 2, 1968  HAJIME OTA  3,391,321

SERIES LOOP BATTERY CHARGER

Filed March 31, 1966  2 Sheets-Sheet 1

INVENTOR
HAJIME OTA
BY
*Irving Seidman*
ATTORNEY.

July 2, 1968    HAJIME OTA    3,391,321
SERIES LOOP BATTERY CHARGER
Filed March 31, 1966    2 Sheets-Sheet 2
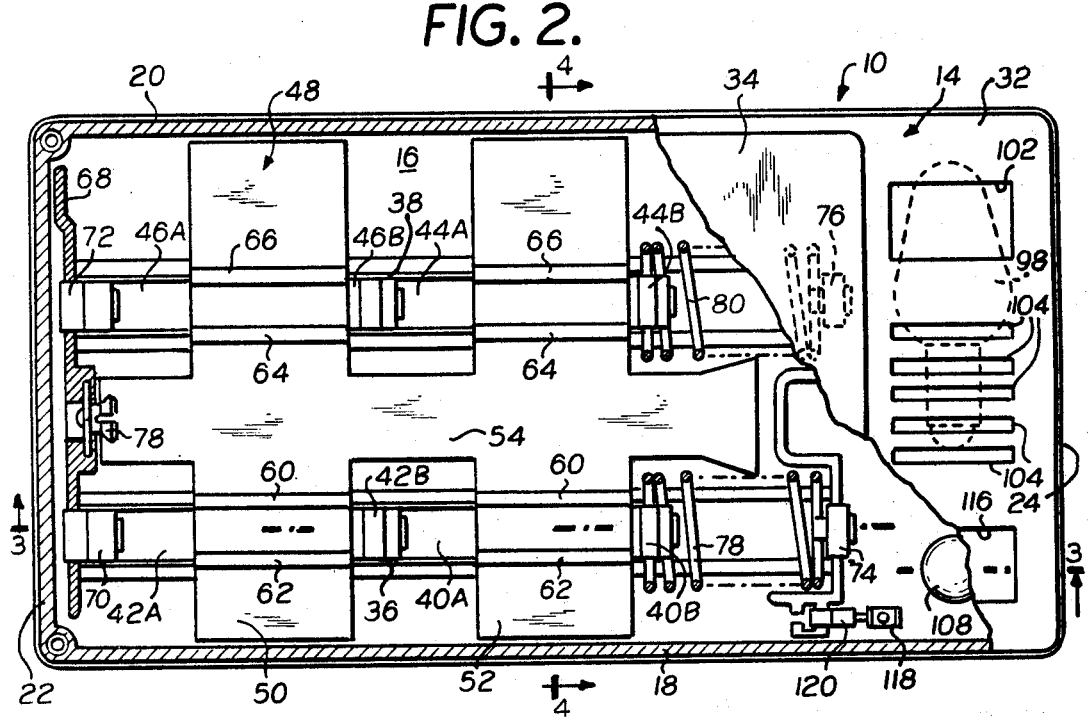
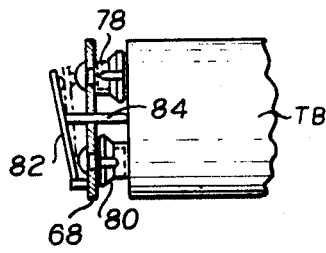
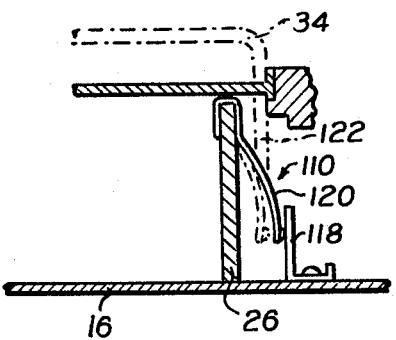
INVENTOR
HAJIME OTA
BY
Irving Reidman
ATTORNEY.

United States Patent Office 3,391,321
Patented July 2, 1968

3,391,321
SERIES LOOP BATTERY CHARGER
Hajime Ota, Tokyo, Japan, assignor to Fedtro, Inc., Rockville Centre, N.Y., a corporation of New York
Filed Mar. 31, 1966, Ser. No. 539,216
9 Claims. (Cl. 320—2)

ABSTRACT OF THE DISCLOSURE

Battery charging apparatus including a housing having a plurality of movable battery contacts therein each of which includes an elongated portion received in a track and an integral upstanding portion. The battery contacts are biased to engage each other to form a series loop with a rectifying circuit and a pair of input terminals. The elongated portion is smaller than the length of a battery whereby adjacent contacts separate when a battery is inserted therebetween so that charging current flows through the battery.

This invention relates generally to battery charging apparatus and more particularly pertains to apparatus for charging a battery of the dry cell type.

The conventional "D" battery, the "penlite" battery and the "transistor" battery are examples of batteries of the so-called dry cell type as opposed to wet cell batteries such as the conventional lead-acid storage battery which is utilized in most automobiles. A major advantage of wet cells over dry cells resides in the fact that the action of a wet cell is reversible. That is, under normal operation, chemical energy is converted into electrical energy. However, electrical energy may be passed through a wet cell to convert the electrical energy back into chemical energy thereby recharging the cell. Recently, however, it has been determined that dry cells also may be recharged by passing a recharging current therethrough.

Accordingly, the desideratum of the present invention is to provide a battery recharging apparatus for recharging dry cell batteries to extend their useful life.

Another object and feature of the present invention resides in the novel details of construction which provide an economical battery recharging apparatus that includes means for testing the degree of charge of a battery.

In furtherance of the above objects, the present invention includes a housing having a plurality of movable battery contacts therein. The battery contacts are normally connected in a series loop or path, which includes a rectifying circuit and a pair of input terminals. The input terminals are adapted to be connected across a source of potential. Biasing means is included for normally biasing the movable contacts together to connect the charging circuit directly from one input terminal to the other. However, adjacent ones of the contacts are adapted to be separated when a battery is inserted therebetween to connect the battery in the series loop. Accordingly, the charging current flows through the battery thereby to charge the same.

A feature of the present invention is to provide a battery charging apparatus which includes a plurality of movable contacts all of which are normally connected together so that a battery may be placed between any preselected adjacent contacts to provide for the flow of a charging current therethrough.

Other objects and advantages of the present invention will become more apparent from a consideration of the following detailed description when taken in conjunction with the accompanying drawings, in which:

FIG. 2 is a top plan view, with parts broken away and partially in cross-section, illustrating the structural arrangement of the elements comprising a battery charging apparatus constructed in accordance with the present invention;

FIG. 5 is a detailed view, with parts broken away, of the battery snap contacts shown in FIG. 2; and FIG. 6 is a fragmentary view in cross-section, illustrating the mechanical interlock between the cover of the housing shown in FIG. 2 and the battery testing circuit shown in FIG. 1.

The drawings are substantially to scale of a working model of the invention. Like numbers in the various figures indicate identical elements.

Figure 1:
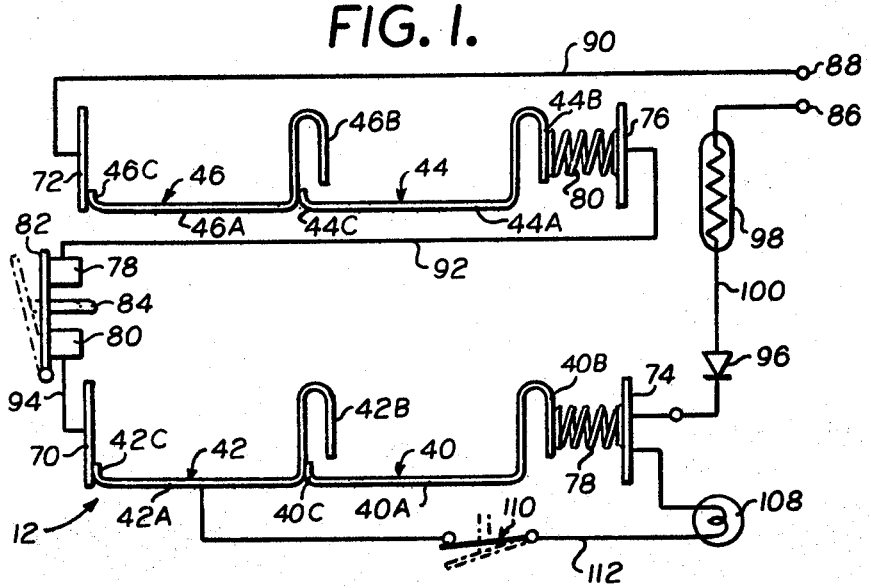
FIG. 1 is a schematic circuit wiring diagram partially in diagrammatic form, of a battery recharging apparatus constructed according to the present invention.
Figure 3:
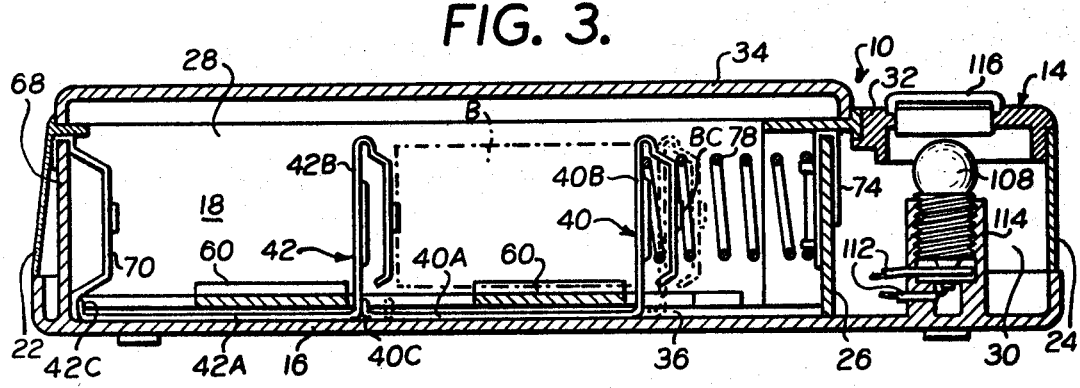
FIG. 3 is a sectional view taken alnog the line 3—3 of FIG. 2.

The battery charging apparatus of the present invention is designated generally by the numeral 10 in FIG. 2 and includes a battery recharging electric circuit designated by the numeral 12 in FIG. 1. The apparatus 10 further includes a housing 14 having a bottom wall 16, opposed side walls 18 and 20, and opposed end walls 22 and 24. Received within the housing 14 in spaced relation to the end wall 24 is a transverse partition 26 that divides the housing into a battery-receiving compartment 28 and a rectifying circuit-receiving compartment 30 (FIG. 3). A cover 32 is received on the housing 14 and overlies the charging circuit-receiving compartment 30. Another cover 34 is pivotally connected between the end wall 22 and the partition 26 and is movable between an open and a closed position to respectively open the battery-receiving compartment 28 and to close the same.

Figure 4:
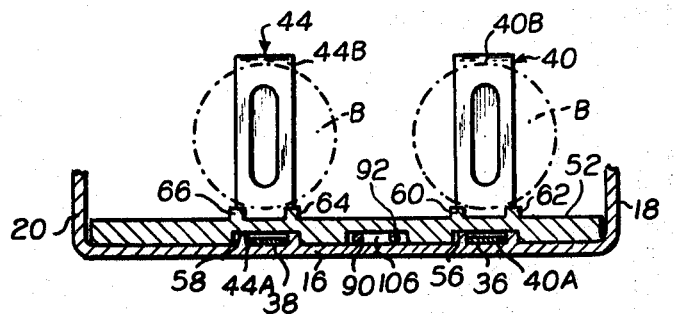
FIG. 4 is a sectional view of the battery charging apparatus of the present invention, taken along the line 4—4 of FIG. 2, with parts broken away.

Provided on the bottom wall 16 in the battery receiving compartment 28 of the apparatus 10 are two transversely spaced tracks 36 and 38 which extend substantially the length of the compartment (FIG. 4). Slidably received in the track 36 are battery terminal engaging contacts 40 and 42. Similarly, slidably received in the track 38 are battery terminal engaging contacts 44 and 46. Since each of the contacts are identical in construction, only the contact 40 will be described in detail. Corresponding portions of the other contacts will be designated by the same letter suffix as that portion of the contact 40, but will be preceded by the numeral of the particular contact.

The contact 40 includes a longitudinally extending leg member 40A which is received within the track 36. The right hand end of the contact 40, as taken in the figures terminates in an upstanding inverted U-shaped portion 40B, the outer leg of which terminates above the bottom wall 16. The left hand end of the leg member 40A terminates in an upturned portion 40C that is adapted to engage the succeeding contact. The track 36 maintains the contacts 40 and 42 in alignment with each other and constrains the contacts for movement in a longitudinal direction only. Additionally, since the outer leg of the portion 42B is spaced above tht bottom wall 16, the end 40C of the contact 40 may pass therebelow to engage the inner leg of the inverted U-shaped member 42B. Similar comments apply to the contacts 44 and 46 which are constrained to move longitudinally in the track 38.

The contacts 40–46 are fabricated from a current conducting material. Accordingly, when the contact 40 is engaged with the contact 42, a complete circuit will exist from the portion 42C of the contact 42 through the element or leg 42A, the upturned portion 40C, the leg 40A of the contact 40 and the inverted U-shaped portion 40B. In a like manner, a complete circuit will exist from the upturned member 46C of the contact 46 to the inverted U-shaped member 44B of the contact 44.

A retaining wall 48 (FIG. 2) is provided on the bottom wall 16 of the housing 14 to maintain the respective contacts 40–46 in their associated tracks. More particularly, the retaining wall 48 includes transverse arms 50 and 52 which extend from the side wall 18 to the side wall 20 and which are longitudinally spaced from each other and interconnected by a central portion 54 that extends beyond the arms 50 and 52. The arms 50 and 52 are provided with transversely spaced recesses 56 and 58 (FIG. 4) which receive the respective tracks 36 and 38 therein so that the bottom surface of the retaining wall 48 is flush with the upper surface of the bottom wall 16 of the housing 14. Accordingly, it will now be obvious that the arms 50 and 52 overlie the elongated legs of the contacts 40–46 to maintain the contacts within the respective tracks 36 and 38. Additionally, the spacing between the arms 50 and 52 and the spacing between the right hand edge of the arm 52 and the partition 26 provide for the longitudinal movement of the respective contacts 42, 46 and 40, 44.

Provided on the arms 50 and 52 are transversely spaced upstanding ribs 60 and 62 which substantially lie in the same planes as the respective ribs which define the track 36. The ribs 60 and 62 provide a support for a battery received on the retaining wall 48 in the manner described in detail below. Additionally, transversely spaced ribs 64 and 66 which substantially lie in the same planes as the respective ribs which define the track 38 are similarly provided on the arms 50 and 52 and provide additional battery supports with respect to the contacts 44 and 46.

A transversely extending wall 68 is provided adjacent the end wall 22 of the housing 14. Mounted on the wall 68 and transversely spaced from one another are stationary contacts 70 and 72. The contacts 70 and 72 are respectively aligned with the movable contacts 42 and 46 and they are respectively adapted to be contacted by the upturned portions 42C and 46C of these contacts.

Mounted on the partition 26 are transversely spaced stationary contacts 74 and 76 which are respectively spaced from the movable contacts 40 and 44. A biasing spring 78 extends between the stationary contact 74 and the portion 40B of the contact 40. Likewise, a biasing spring 80 extends between the stationary contact 76 and the inverted U-shaped portion 44B of the movable contact 44. The spring 78 is fabricated from a current conducting material and biases the contacts 40 and 42 toward the left, as taken in FIGS. 1 and 2, so that the portion 40C engages the contact 42 and the portion 42C engages the stationary contact 70. In a like manner, the spring 80 is also made of current conducting material and it is operable to bias the portion 44C into engagement with the contact 46 and the portion 46C into engagement with the stationary contact 72. Thus, the contacts 72 and 76 will normally be electrically connected together through the respective contacts 46 and 44 and the spring 80. Additionally the contact 70 will be connected to the contact 74 through the contacts 42 and 40 and the spring 78.

Mounted on the wall 68, intermediate the contacts 70 and 72, are vertically spaced snap contacts 78 and 80 which are adapted to engage the terminals of a so-called transistor battery TB, as shown in FIG. 5. A shorting strip 82 normally connects the contacts 78 and 80 together as shown by the dotted lines in FIG. 5. Connected to the shorting strip 82 and projecting outwardly therefrom through the wall 68 is an actuating pin 84. Accordingly, when a transistor battery TB is connected to the terminals or contacts 78 and 80, the top surface of the battery engages the pin 84 to move the shorting strip rearwardly, as shown by the solid lines of FIG. 5, thereby to disconnect the shorting strip 82 from the terminals 78 and 80.

The electric circuit 12 further includes a pair of input terminals 86 and 88 (FIG. 1) which are adapted to be connected to a source of potential (not shown). The terminal 88 is connected to the stationary contact 72 by a lead 90. The stationary contact 76 is connected to the snap contact 78 by a lead 92. Contacts 80 and 70 are interconnected by a lead 94. The stationary contact 74 is connected to the terminal 86, through a rectifying circuit-receiving compartment 30. The resistance element 98 comprises a lamp which is visible through a window 102 in the cover 32. A plurality of vent holes 104 are similarly provided in the cover 32 to allow the heat generated by the lamp 98 to be dissipated therethrough. The retaining wall 48 is provided with a central recess 106 that receives the leads 90 and 92 therein so that these wires are hidden from view, so that the apparatus of the present invention presents a neat appearance.

As a feature of the present invention, a testing circuit is included to test the charge of a battery. The testing circuit comprises a lamp 108 that is connected between the stationary contact 74 and the movable contact 42, through a signal-pole single-throw switch 110, by a lead 112. As shown in FIG. 3, the lamp 108 is received within the socket 114 in the rectifying circuit-receiving compartment 30 and it is positioned below a window 116 in the cover 32.

The switch 110 is shown in detail in FIGS. 2 and 6 and comprises a stationary contact 118 and a flexible contact 120 which is connected to the partition 26. The flexible contact 120 is fabricated from spring steel or the like so that it may be flexed away from the contact 118 thereby opening the switch. In order to effect such flexing, the cover 34 is provided with a depending extension 122 as shown by the dotted lines in FIG. 6. The extension 122 is adapted to engage the contact 120 when the cover 34 is closed, thereby to flex the contact 120 away from the contact 118 to open the switch 110 and to disable the testing circuit. However, when the cover 34 is opened, the contact 120 will spring back the engagement with the contact 118 thereby re-establishing the testing circuit.

In operation, a source of potential such as an alternating current source may be connected across the terminals 86 and 88. Because of the polling of the diode 96, current will flow from the terminal 86 through the rectifying circuit comprising the resistor (lamp) 98 and the diode 96, stationary contact 74, spring 78, contacts 40, 42 and 70, lead 94, contact 80, shorting strip 82, contact 78, lead 92, contact 76, spring 80, contacts 44, 46 and 72, and through the lead 90 back to the source which is connected to the terminal 88. It is noted that the respective springs 78 and 80 cause the associated movable contacts to engage one another and the associated stationary contacts 70 and 72 and thereby to essentially produce a short circuit between the diode 96 and the terminal 88 to connect the rectifying circuit directly across the input terminals 86 and 88.

When it is desired to charge a single battery, such as a conventional D cell, C cell, or a penlite cell, the cell is inserted between any adjacent movable contacts such as the contacts 44 and 46 or the contacts 40 and 42. Alternatively, the cell may be placed between any one of the movable contacts 42 or 46 and its associated stationary contact 70 or 72. For illustrative purposes, it is assumed that the battery B is inserted between the movable contacts 40 and 42, as shown in FIG. 3. Accordingly, the battery B is inserted between the outer leg of the portion 42B of the contact 42 and the inner leg of the portion 40B of the contact 40 with the center electrode 13C in contact with the portion 40B. The elongated leg portions 40A–46A of the respective contacts 40–46 are sized so that they are slightly smaller in length than the length of the battery. Accordingly, when the battery B is inserted between the contacts 40 and 42, the contact 40 will be moved toward the left, against the bias of the spring 78, to the dotted line position shown in FIG. 3. Thus, the portion 40C will be moved away from the contact 42 and into spaced relation thereto thereby breaking the direct connection between the contacts 40 and 42. The charging current will now flow directly from the portion 40B of the contact 40 through the battery B and the portion 42B of the contact 42 and through the remaining elements of the circuit thereby to charge the battery B. The ribs 60 and 62 on the retaining wall 48 position the battery B so it will be approximately centrally located with respect to the contacts 40 and 42.

It will now be obvious that had the battery B been positioned between any of the other contacts in the circuit, a similar movement would have occurred with respect to the movable contact which engaged the battery thereby to move the portion 42C, 44C or 46C away from the associated contact to break the short circuit and allow the charging current to flow through the battery per se. This same action will occur if more than one battery is connected between any adjacent set of contacts. That is, the battery will cause the associated movable contact to move away from the adjacent contact thereby breaking the circuit therebetween and causing the charging current to flow through the battery. Thus, the apparatus of the present invention may be utilized to charge from one to four dry cells.

Since the D battery is approximately the same length as the conventional penlite or C cells, the apparatus of the present invention may also be utilized to charge these size cells. That is, the insertion of a penlite cell between any adjacent set of contacts will similarly cause the contacts to disengage and cause the charging current to flow through the penlite battery.

During the charging of a battery, the cover 34 is closed thereby opening the switch 110 and disabling the testing circuit in the manner noted above.

When it is desired to charge a transistor battery, such as the battery TB shown in FIG. 5, the battery is connected to the contacts 80 and 78 thereby removing the shorting strip 82 from across these contacts as described hereinabove. Thus, the charging current will flow from the contact 80 through the battery and out of the contact 78 and back to the source of potential through the aforementioned circuit elements. Since the current flow is from terminal 86 to the terminal 88, the positive central electrode of the batteries should be connected to the inverted U-shaped portion of the associated contact. Additionally the apparatus 10 of the present invention may be used in conjunction with a direct current source as long as the positive terminal thereof is connnected to the terminal 86.

When it is desired to test a battery, the cover 34 is opened thereby re-establishing the testing circuit by closing the switch 110. That is, when the cover 34 is opened the contact 120 flexes back to its original position to engage the contact 118. The source of potential is removed from the input terminals 86 and 88. The battery to be tested is then inserted between the contacts 40 and 42 in the manner noted above. Accordingly, if the battery is fully charged, a current will flow from the battery through the spring 78 contact 74, and through the lamp 108 via the lead 112, and the contact 42 back to the battery thereby illuminating the lamp 108. Failure of the lamp 108 to illuminate will mean that the battery is discharged.

Accordingly, a battery charging apparatus has been described for efficiently and effectively recharging batteries of the dry cell type thereby to extend their useful life.

While a preferred embodiment of the invention has been shown and described herein, it will become obvious that numerous additions, changes and omissions may be made in such embodiment without departing from the spirit and the scope of the present invention.

What is claimed is:
1. Battery charging apparatus comprising
a housing;
battery engaging means within said housing adapted to receive a battery therein for maintaining the battery in place and for conducting a current through the battery;
a pair of input terminals adapted to be connected to a source of potential;
a rectifying circuit in said housing for producing a battery charging current;
lead means for connecting said rectifying circuit, said battery engaging means and said input terminals in a series loop;
said battery engaging means including a plurality of battery contacts movable between a short circuiting position wherein said battery contacts are connected together to connect said rectifying circuit directly from one to the other of said pair of input terminals and an open position wherein adjacent ones of said plurality of battery contacts are separated;
adjacent ones of said battery contacts being adapted to receive a battery therebetween;
and biasing means for biasing all of said plurality of battery contacts to the short circuiting position to normally connect said rectifying circuit directly across said input terminals.
whereby the insertion of a battery into said battery engaging means causes preselected adjacent ones of said battery contacts to move to the open position to provide for the flow of the charging current through the battery, and a pair of battery snap contacts connected in said series loop; shorting means connected across said pair of snap contacts for normally shorting said pair of snap contacts together and being responsive to the connection of a battery to said pair of contacts for removing said shorting means from said pair of snap contacts.

2. Battery charging apparatus as in claim 1,
in which said housing includes a bottom wall and opposed end walls,
said battery engaging means further including a stationary contact on one of said end walls engageable by a movable contact, preselected ones of said plurality of movable battery contacts therein in a row,
said biasing means including a first spring mounted on the other end wall and engaging the adjacent one of said preselected ones of said plurality of movable contacts to move all of said plurality of contacts in said row to the short circuiting position.

3. Battery charging apparatus as in claim 2,
and a second track slidably receiving other ones of said plurality of movable contacts in a second row,
a second stationary contact in said one of said end walls, engageable by a movable contact,
said biasing means including a second spring mounted on the other end wall and engaging the adjacent one of said other ones of said plurality of movable contacts to move all of said second row of contacts to the short circuiting position,
and means for serially connecting said first and second rows together.

4. Battery charging apparatus as in claim 1,
in which said housing is provided with two compartments,
said battery engaging means being received in one of said compartments,
said rectifying circuit being received in said second compartment,
said rectifying circut comprising the series connection of a high resistance lamp and a diode,
a window in said housing overlying said lamp, and
a plurality of vents in said housing overlying said lamp to provide for the dissipation of the heat generated by said lamp.

5. Battery charging apparatus according to claim 1,
and a test circuit connected to predetermined adjacent ones of said movable contacts,
said circuit comprising a test lamp adapted to be illuminated by a charged battery inserted between said predetermined adjacent ones of said movable contacts when said predetermined adjacent ones of said movable contacts are moved to the open position.

6. Battery charging apparatus according to claim 5, in which said housing includes a cover movable between an open and a closed position,
a switch serially connected with said test lamps, and
means on said cover adapted to open said switch when said cover is moved to the closed position thereby to disable said testing circuit.

7. A battery charger comprising
a housing having a bottom wall,
opposed end walls,
and opposed side walls;
battery engaging means within said housing adapted to receive a battery therein for maintaining the battery in place and for conducting a current through the battery;
a pair of input terminals adapted to be connnected to a source of potential;
a rectifying circuit in said housing for producing a battery charging current;
lead means for connecting said rectifying circuit, said battery engaging means and said input terminals in a series loop;
a plurality of tracks in said bottom wall;
said battery engaging means including a plurality of battery contacts slidably received in said track and being movable between a short circuiting position wherein said contacts are connected together to connect said rectifying circuit directly from one to the other of said pair of input terminals and an open position wherein adjacent ones of said plurality of battery contacts are separated;
adjacent ones of said battery contacts being adapted to receive batteries therebetween; each of said plurality of battery contacts having an elongated portion received in the respective track and an integral substantially rigid upstanding element adapted to abut a battery when a battery is received in said housing;
said elongated portions being adapted to engage the upstanding element of the adjacent battery contact connecting for all of said plurality of battery contacts in the short circuiting position to normally connect said charging circuit directly across said pair of input terminals,
said elongated portion being smaller than the length of the battery so that the insertion of a battery into said battery engaging means causes preselected adjacent ones of said battery contacts to move to the open position to provide for the flow of a charging current through the battery.

8. A battery charger as in claim 7,
and a retaining wall supported on said bottom wall,
said retaining wall having recesses defined therein for receiving said tracks therein to maintain said plurality of battery contacts in said tracks,
a pair of snap contacts on one of said end walls connected in said series loop, and
a shorting strip normally shortening said snap contacts together and being responsive to the connection of a battery to said pair of snap contacts for removing said shorting strip from said pair of snap contacts.

9. A battery charging apparatus as in claim 8,
and a test circuit in said housing,
said test circuit comprising the series connection of a lamp and a switch connected between an adjacent pair of said plurality of movable contacts,
said housing including a cover movable between an open position and a closed position,
means on said cover adapted to engage said switch when said cover is in the closed position thereby to open said switch,
said switch comprising a flexible member normally operable to close said switch when said cover is in the open position,
whereby the charge on a battery may be tested by inserting the battery between said adjacent pair of contacts when said cover is open thereby to illuminate said lamp.

References Cited
UNITED STATES PATENTS

| | | | |
|---|---|---|---|
| 2,566,969 | 9/1951 | Sorensen | 320—48 X |
| 3,209,230 | 9/1965 | Mas | 320—2 |
| 3,307,096 | 2/1967 | Lyon | 320—15 |

JOHN F. COUCH, *Primary Examiner.*

S. WEINBERG, *Assistant Examiner.*